Figure 1:
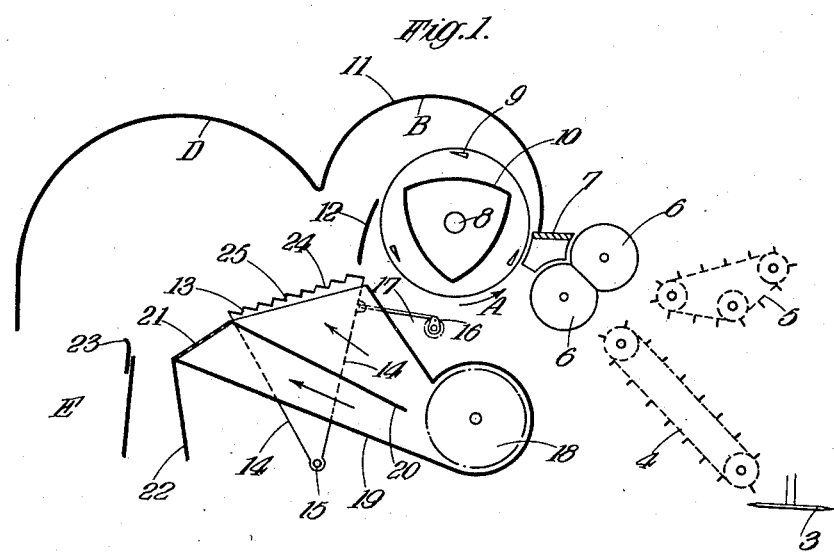

May 22, 1934.  R. S. FALKINER ET AL  1,959,781
CANE HARVESTING MACHINE
Filed April 24, 1929

INVENTOR
RALPH S. FALKINER
WALTER G. CHARLEY
BY
ATTORNEY
E.C. Sanborn

Patented May 22, 1934

1,959,781

UNITED STATES PATENT OFFICE 1,959,781

CANE HARVESTING MACHINE

Ralph Sadleir Falkiner and Walter George Charley, Melbourne, Victoria, Australia, assignors, by direct and mesne assignments, to Falkiner Cane Harvester Corporation of America, New York, N. Y.

Application April 24, 1929, Serial No. 357,708 In Great Britain June 9, 1928

1 Claim. (Cl. 146—118)

This invention relates to the harvesting of sugar cane and more particularly to improved methods of and apparatus for separating the tops, trash and dead cane from the cane as it is cut by a harvesting machine.

The invention is particularly, but not exclusively, adapted for use with cane harvesting machinery such as that described in the specification of prior British Patent No. 251,739 and in the specifications of applications for British Patents Nos. 284,683, 9,159 of 1928 and 14,127 of 1928.

In the harvesting machinery described in the aforesaid specifications, in one arrangement, as the cut cane from the chaffing knife falls upon the elevator which is arranged to lift it into the cart or the like it was subjected to an air blast, which, however, removed only a portion of the trash, etc.

In another arrangement, a trash removing elevator was provided in conjunction with an air suction for inducing the trash to adhere to the elevator. The object of the present invention is to obtain an improved separation by means of an air blast.

According to the invention, the severed cane, together with the tops and trash is passed through the cutting mechanism on the harvesting machine which chaffs or cuts all the material into small pieces.

The chaffed material, discharged from the cutting mechanism falls on to a screen, which may be vibrated and arranged over an air blast. The cutting mechanism and the screen are surrounded by hoods or baffles of suitable shape and the air blast is so regulated that the screen is subjected to an upward low pressure blast over a portion of its area and to an upward blast of higher pressure over another portion of said area. Preferably the material discharged from the cutting mechanism falls first upon the low pressure area of the screen and the air blast blows the lighter trash upwardly leaving the good cane on the screen, the trash being guided by the hood or baffle to discharge upon the ground or to any other suitable point. The cane then rolls over the higher pressure area of the screen and any remaining trash which may be too heavy for removal by low pressure air is blown out and conducted by the hood or baffle to the ground, the good cane thus freed from trash falling into a chute or conveyor or other means for discharging it into a wagon or container. The screen is arranged at a suitable slope to assist the travel of the material and the portion over the higher pressure air blast may be stationary if desired, in fact the screen may be formed in two portions set at an angle as hereinafter described.

To enable the invention to be fully understood it will now be described by reference to the accompanying drawing in which:—

Figure 2:
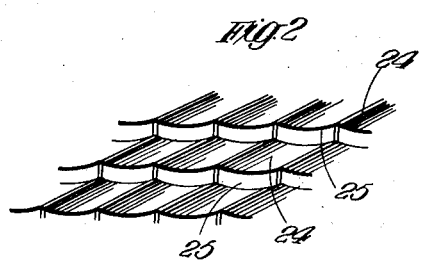

Fig. 1 is a diagrammatic representation of a harvesting machine having one form of the invention applied thereto, and Fig. 2 is a detail showing the preferred construction of one of the screens which may be employed.

The invention is shown in Fig. 1 as applied to a harvesting machine of the kind described in the aforesaid specifications. This machine comprises ground cutting knives 3 (one only being shown) for severing the cane, a moving conveyor 4 cofor operating with a second moving conveyor 5 for feeding the severed cane and trash to a pair of rollers 6, preferably pneumatic, which grip the material and feed it to the cutting mechanism. The cutting mechanism comprises a fixed knife 7, beneath which the material is fed and a shaft 8 carrying revolving knives 9, the shaft being surrounded by a deflector plate 10. The knives 9 revolve in the direction of the arrow A so that the cut material is thrown upwardly, the plate 10 acting as set out in the aforesaid specifications. A hood or baffle 11 is arranged over the cutter as shown and a second baffle 12 is provided, so that the cut material as it is discharged from the cutter is caused to fall on to a screen 13 arranged at an angle as shown. The screen is preferably rocked or vibrated and is mounted on members 14 pivoted at 15, one member being connected to a crank 16 by a link 17. The crank 16 is suitably driven from the machine so that in operation the screen 13 is rocked about the pivot 15. Beneath the screen 13 is arranged a rotary fan or other blower 18, in a tapered chamber 19 having a baffle 20 which extends across the chamber and so divides it into two unequal columns, the screen being arranged over the column having the mouth of greater cross sectional area. Across the mouth of the second or smaller column a preferably fixed screen 21 is arranged, at an angle to the screen 13 as shown, to assist the travel of the cane thereover and to lead it into a discharge chute 22. The chute 22 is also provided with an adjustable baffle 23. The screen 13 is preferably formed as shown in Fig. 2, that is to say it consists of a series of layers of curved sections 24, arranged one above the other with air spaces 25 between each layer. Thus a series of corrugated steps with air spaces in between is formed, the corrugations assisting to turn the cut pieces of cane end on, which facilitates their travel over the screen and also places them in a better position for the operation of the air blast. Any other suitable type of screen may be used.

With the above described construction, the cut material as it is thrown upwardly by the cutter meets the baffle B which directs it on to the screen 13 which is vibrating, the air blast also issuing through the air spaces 25 as will be understood. This blast causes the lighter trash to be blown out into contact with the baffle D which directs it to the discharge point E without disturbing the cane which rolls over on the screen 21. An air blast also issues through the perforations of the screen 21, and owing to the position of the baffle 20 the air blast through the screen is of a higher pressure than the blast through screen 13. Thus any heavier trash which may have escaped removal on the screen 13 is then blown out and over the baffle 23 to the discharge point. It will be understood that the air blasts are of such a pressure that they fail to lift the good cane to any appreciable extent, so that the cane rolls off the screen 21 into the chute 22. At the same time the blast through the screen 21 must be sufficiently strong to prevent the trash from falling into the chute 22.

It will be understood that the invention may be applied to cane harvesting machines of various types.

Having thus described the nature of the said invention and the best means we know of carrying the same into practical effect, we claim:—

In a cane harvesting machine, means for cutting severed cane tops and trash into small pieces, said means comprising a fixed knife, a rotary knife cooperating therewith, and means carried with the rotary knife for throwing the cane upwardly away from the point at which it is cut, a screen, baffle means above said cutting means and extending upwardly and outwardly therefrom to deflect the cut pieces of cane onto said screen adjacent said baffle, means for directing an air blast through the screen for blowing out the lighter trash, means comprising a baffle for directing said lighter trash to a suitable discharge point, and means receiving the heavier pieces of cane from the screen.

RALPH SADLEIR FALKINER.
WALTER GEORGE CHARLEY.